J. F. Harcourt.

Wheat Drill.

No. 3,626. Reissued Aug. 31, 1869.

Witnesses:

J. N. B. Livingston

Jas. A. Lewis

Inventor:

James F. Harcourt per M. Wood & Co.

Attorneys.

N. PETERS, PHOTO-LITHOGRAPHER, WASHINGTON, D. C.

UNITED STATES PATENT OFFICE.

JAMES F. HARCOURT, OF MOSCOW, INDIANA.

IMPROVEMENT IN WHEAT-DRILLS.

Specification forming part of Letters Patent No. 59,595, dated November 13, 1866; Reissue No. 3,626, dated August 31, 1869.

*To all whom it may concern:*

Be it known that I, JAMES F. HARCOURT, of Moscow, Rush county, Indiana, have invented a new and Improved Wheat-Drill; and I do hereby declare that the following is a full, clear, and exact description thereof, which will enable others skilled in the art to make and use the same, reference being had to the accompanying drawings, making part of this specification, in which—

Figure 1:
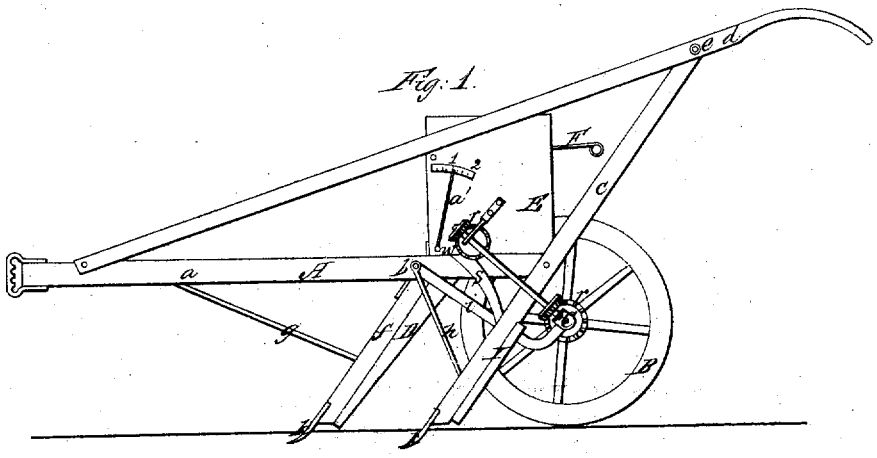
Figure 2:
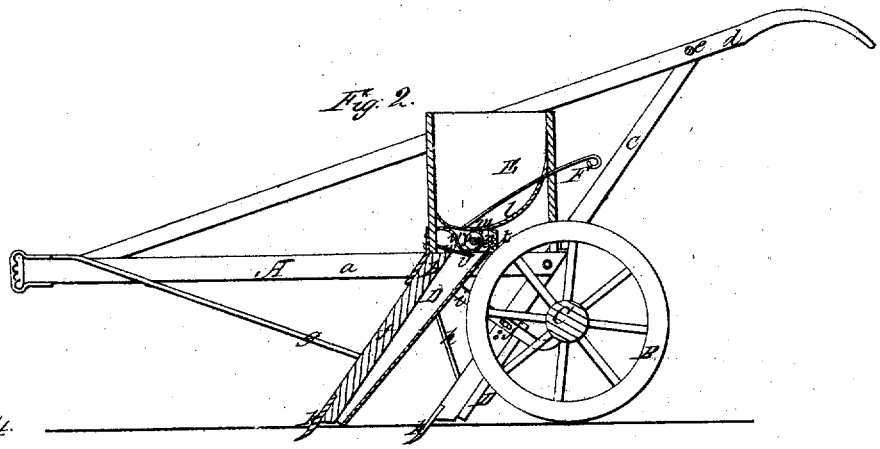
Figure 4:
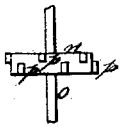
Figure 3:
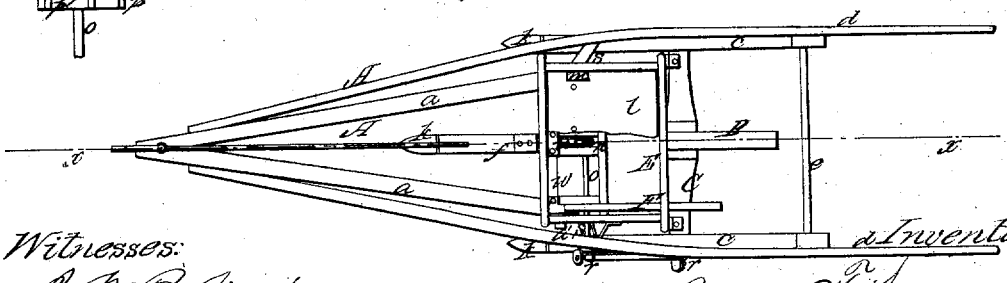

Figure 1 is a side view of my invention. Fig. 2 is a vertical longitudinal section taken in the line *x x*, Fig. 3. Fig. 3 is a plan or top view of the same. Fig. 4 is a detached view of a seed-distributing wheel pertaining to the same.

Similar letters of reference indicate like parts.

This invention relates to a new and improved device for sowing wheat and other grain in drills; and it consists in a novel construction and arrangement of parts, as hereinafter fully shown and described, whereby a very simple and efficient implement for the purpose is obtained, one which may be turned within a limited compass, and which will admit of having the seed planted at a greater or less depth, as may be desired.

A represents the frame of the machine, composed of two bars, *a a*, arranged in V form, and connected by a cross-bar, *b*. The rear ends of bars *a a* are attached to standards *c c*, slightly inclined, and the front part of bars *a a* have the lower ends of the handles *d d* bolted to them, the rear parts of said handles being connected by a screw-rod, *e*, with the upper ends of the standards *c c*. A standard, *f*, is fitted on the cross-bar *b* of the frame A and is braced by a rod, *g*, the lower ends of the standards *c c* being braced by rods *h*. The standard *f* is in front of the standards *c c*, and in line with the center of the space between said standards.

B represents a wheel, the shaft C of which has its bearings in the rear parts of the arms *i i*, the front ends of which are fitted on the ends of the cross-bar *b*, or on bolts passing into the ends of the same. The shaft C is at the rear of the standards *c c*, and said shaft and wheel may be adjusted higher and lower by adjusting the rear parts of the arms *i i* higher or lower, pins *j* passing through oblong slots in the arms into any one of the series of holes in the standards *c c*. The wheel B is placed to the rear of and directly in line with the standard *f*, so as to follow in the track of the share at the lower end of the same, the said share pushing aside stones and clods which would otherwise interfere with the wheel and cause irregularity in the rotation of the seed-shaft, and in the depth penetrated by the shaves. The standards *c c f* have each a seed-conveying tube, D, attached to their rear sides through which the seed discharged from the hopper E drops into the furrows, the latter being made by shares *k* attached to the lower ends of the standards, and it will be seen that the depth of the furrows may be regulated by adjusting the wheel B higher or lower. The hopper E is fitted on the rear end of the frame A, and is provided with a concave bottom, *l*, having the openings *m* made in it, said openings being directly over wheels *n* on a shaft, *o*, underneath the bottom *l*. The wheels *n* are provided at their peripheries with teeth *p*, (see Figs. 2 and 4,) and these wheels discharge the seed from the hopper, the shaft *o* being rotated by gears *r* from the shaft C, as shown clearly in Fig. 1. The central wheel, *n*, discharges the seed directly into the tube D of the front standard, *f*; but the other two wheels discharge the seed into tubes S, which lead into the tubes D of the standards *c c*, traversing or partially traversing holes or mortises in the said standards, and by thus connecting the frame A (to which their upper ends are attached) with the standards from side braces for the latter. The wheels *n* work or rotate within small boxes or inclosures *t*, each of which is provided with an elastic or yielding plate, *u*, at its bottom, by raising or lowering which the discharge of seed may be graduated as desired, said plates being adjusted by arms *v*, which project from a shaft, *w*, the latter being turned through the medium of an index-arm, *a'*, at the outer side of the hopper. (See Figs. 1 and 3.)

If necessary or desired, cut-offs F may be fitted within the hopper, so that seed may be discharged from two or one only of the holes or openings *m* whenever required.

Having thus described my invention, I claim as new and desire to secure by Letters Patent—

1. The concave bottom *l*, in hopper E, provided with the holes or openings *m*, in combination with the toothed wheels *n*, fitted in inclosures *t*, underneath the bottom *l*, the yielding plates *u*, and arms *v*, attached to shaft *w*, for adjusting the plates *u*, substantially as and for the purpose set forth.

2. The pivoted standard *c*, in combination with the slotted arm *i*, bearing the shaft C, substantially as described, for the purpose specified.

3. The adjustable yielding plate *u*, in combination with arms *v*, shaft *w*, and index-arm *a'*, substantially as described, for the purpose specified.

4. The arrangement of the adjusting-wheel B in line with and in rear of the central standard *f*, as and for the purpose stated.

5. The seed-conductors S, attached at their respective ends to the frame A and standard *c*, in the manner described, so as to form braces or supports for said standards, as set forth.

6. In combination with the wheel B and the seed-shaft and its accessories *n o p t u v*, the gears *r*, communicating motion from the wheel B to the said shaft, as described.

In testimony of which invention I hereunto set my hand.

JAMES F. HARCOURT.

Witnesses:
GEO. H. KNIGHT,
JAMES H. LAYMAN.